United States Patent [19]

Murayama et al.

[11] Patent Number: 5,243,426
[45] Date of Patent: Sep. 7, 1993

[54] CIRCUIT FOR GAMMA CORRECTION OF A DIGITAL VIDEO SIGNAL AND HAVING A MEMORY FOR STORING DATA DEFINING A DESIRED GAMMA CORRECTION CHARACTERISTIC

[75] Inventors: Hideaki Murayama; Isamu Yamamoto, both of Kanagawa, Japan

[73] Assignee: Sony Corporation, Tokyo, Japan

[21] Appl. No.: 693,007

[22] Filed: Apr. 29, 1991

[30] Foreign Application Priority Data

May 14, 1990 [JP] Japan .................................. 2-121236

[51] Int. Cl.[5] .............................................. H04N 5/202
[52] U.S. Cl. ............................................ 358/164; 358/32
[58] Field of Search .................................... 358/32, 164

[56] References Cited

U.S. PATENT DOCUMENTS

| 4,187,519 | 2/1980 | Vitols et al. | 358/169 |
| 4,805,013 | 2/1989 | Dei et al. | 358/164 |
| 5,047,861 | 9/1991 | Houchin et al. | 358/164 |

FOREIGN PATENT DOCUMENTS

| 0382100 | 8/1990 | European Pat. Off. . |
| 0390179 | 10/1990 | European Pat. Off. . |
| 0455426 | 11/1991 | European Pat. Off. . |
| 3833077 | 4/1989 | Fed. Rep. of Germany . |
| 0060392 | 3/1987 | Japan . |
| 0120564 | 5/1988 | Japan . |
| 0230873 | 9/1990 | Japan . |
| 2210531 | 6/1989 | United Kingdom . |

OTHER PUBLICATIONS

Royal Television Society Journal, vol. 14, No. 11, Sep. 1973, London GB pp. 261-264; Baldwin: 'The Digital Television Studio Centre' p. 261, Right Column, Line 1-p. 262, Right Column, Line 17; FIGS. 6-7.

Primary Examiner—James J. Groody
Assistant Examiner—Jeffrey S. Murrell
Attorney, Agent, or Firm—William S. Frommer; Alvin Sinderbrand

[57] ABSTRACT

A gamma correction circuit converts digital video data to address data, reads out slope and intercept data for segments of a polygonal line approximation of a desired gamma correction characteristic stored at the address, and uses the read out data to generate a gamma corrected output video signal. Another gamma correction circuit directly uses digital video data to address previously stored level correction data, then uses the level correction data and a coefficient K to generate a gamma corrected output video signal.

5 Claims, 5 Drawing Sheets

CIRCUIT FOR GAMMA CORRECTION OF A DIGITAL VIDEO SIGNAL AND HAVING A MEMORY FOR STORING DATA DEFINING A DESIRED GAMMA CORRECTION CHARACTERISTIC

BACKGROUND OF THE INVENTION

1. Field of the Invention

This invention relates to a gamma correction circuit, and more particularly to a gamma correction circuit for a digital video signal.

2. Prior Art

The relationship between a grid signal voltage and a luminous output of a color image receiving tube is not linear. The luminous output is proportional to, e.g., the 2.2-th power of an input signal applied to the grid. For this reason, when a signal from a video camera is applied to a color image receiving tube as it is, not only the luminance of an image on the screen but also its hue and/or saturation vary greatly. To prevent this, a technique is employed to pass an input signal, prior to applying it to the color image receiving tube, through a gamma correction circuit having an input/output characteristic such that an output signal is equal to, e.g., one 2.2-th power of an input signal, thus allowing the overall characteristic to be linear. It is sufficient to insert the gamma correction circuit immediately before the signal is applied to the grid of the color image receiving tube. However, due to economic and stability considerations, such a gamma correction circuit is not provided in association with a color image receiver of a home electronic apparatus, but is provided at the transmitting side, i.e., in a video camera.

In recent years, also with respect to video cameras, digital video signal processing technology to digitally process video signals has been widely used, and the above-mentioned gamma correction circuit has been constituted with a digital circuit.

For example, there is known a so-called mapping system which stores in advance a gamma correction characteristic into a memory and reads out from the memory a gamma corrected digital video signal. Namely, an approach is employed to store in advance an output signal level of the input/output characteristic for the gamma correction into the memory, to read out that output signal level from the memory by using an input signal level as a readout address for the memory, to use this output signal as a gamma corrected signal.

Figure 1:
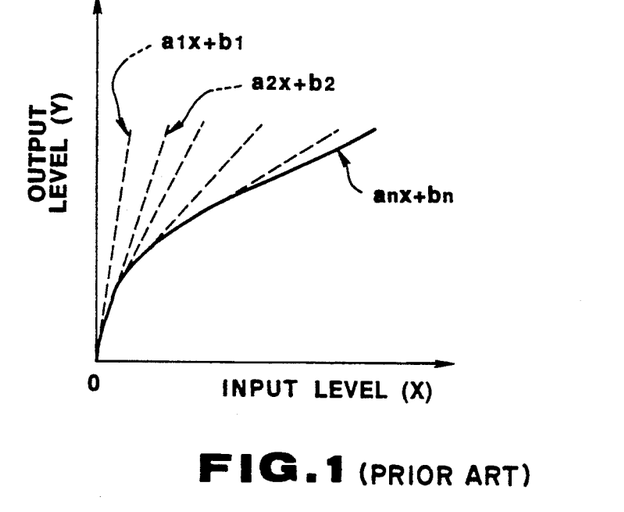
FIG. 1 is a graphical representation of polygonal lines conventionally used to approximate a gamma correction characteristic.
Figure 2:
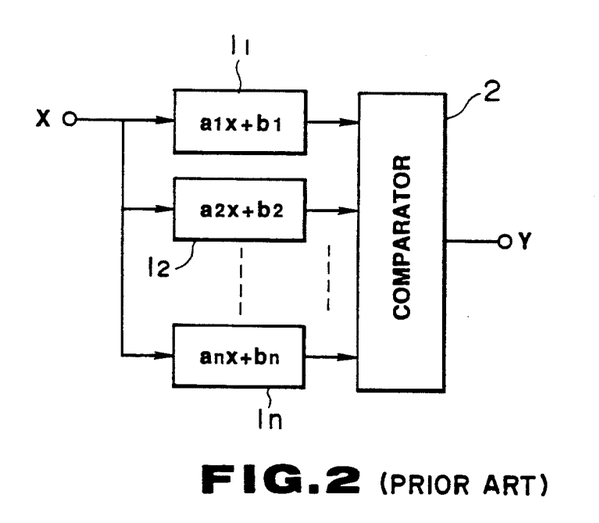
FIG. 2 is a block diagram showing the configuration of a conventional gamma correction circuit.

Further, as shown in FIG. 1, for example, there is known a gamma correction circuit adapted to perform gamma correction using a polygonal line approximating a desired gamma correction characteristic. Namely, as shown in FIG. 2, there is an approach to realize characteristics of respective segments of a polygonal line at respective operation circuits $1_1$ to $1_n$ comprised of multiplier circuits and adder circuits, etc., to compare outputs from the respective operation circuits $1_1$ to $1_n$ at a comparison circuit 2, to select the minimum value, thus providing a gamma corrected digital video signal.

In the above-described gamma correction using the mapping system, it is necessary to store all points on a curve $(Y = X^{(1/r)})$ indicating the gamma correction characteristic. As a result, a memory of a when an approach is employed in order to realize high tone e.g., to increase the number of bits of a digital video signal, a memory of yet a larger capacity is required. Particularly, in the case of constructing the gamma correction circuit as an integrated circuit, e.g., by a so-called gate array, the increased memory capacity is an obstruction. Further, in the configuration of the memory, there is generally employed a scheme in which 8 bits are taken as one byte and in which the carrying out of a write/read of data is performed using a byte unit. Accordingly carry out write/read of data every byte. Accordingly, when the number of bits of a digital video signal is above 8, use efficiency of the memory is poor.

Moreover, in the case of altering the gamma correction characteristic for correspondence with different gamma correction characteristics, e.g., at every broadcasting station, the entirety of the memory contents must be rewritten. However, since the capacity of such a memory is large, much time is consumed in preparing data, in writing prepared data into the memory, or the like.

Further, in the case of the gamma correction circuit of the above-described configuration shown in FIG. 1, if the number of lines is increased for improving the precision of the polygonal line approximation, then the number of operation circuits increases accordingly, resulting in a problem in that the circuit scale becomes large. Furthermore, when the number of lines is above a certain value, it is difficult to realize a gamma correction circuit. In addition, it is necessary to alter characteristics (coefficients $a_i$, $b_i$: i=1 to n) of all the operation circuits $1_1$ to $1_n$ in order to vary the gamma correction characteristic. However, this is impossible from a practical point of view.

OBJECTS AND SUMMARY OF THE INVENTION

With such circumstances in view, an object of the present invention is to provide a gamma correction circuit which requires less memory capacity than is required by the prior art to carry out gamma correction of a digital video signal, by using a polygonal line approximating a desired gamma correction characteristic, thus permitting the entire circuit scale to be smaller.

Another object of this invention is to provide a gamma correction circuit with a gamma correction characteristic that can be readily changed, and which is on a circuit scale smaller than that of the prior art.

To achieve the above-described objectives, in the first embodiment of this invention, there is provided a gamma correction circuit for use with a video camera having image pick-up means for generating a video signal corresponding to an object image, and analog-to-digital (A/D) converter means for converting the video signal to corresponding digital video signal data, the gamma correction circuit comprising: memory means for storing slope data and intercept data defining successive segments of a polygonal line approximating a desired gamma correction characteristic and which are stored at respective addresses of said memory means, converter means for converting the digital video signal data to readout address data applied to the memory means for reading out the slope data and intercept data stored at respective addresses thereof, multiplier means for multiplying slope data read out from the memory means by the digital video signal data so as to provide a multiplied output, and adder means for adding intercept data read out from the memory means and the multiplied output so as to generate a gamma corrected output.

In accordance with the gamma correction circuit of the first embodiment, a desired gamma correction of a digital video signal can be carried out by using slope data and intercept data of respective line segments of a polygonal line approximating the desired gamma correction characteristic, which read out from the memory means.

Further, with a view to solving the above-described problems, in accordance with the third embodiment of this invention, the gamma correction circuit may comprise memory means for storing level data at respective address corresponding to the values of the digital video signal data, the level data obtained by subtracting a curve representing uncorrected digital video signal data from a desired gamma correction characteristic, multiplier means for multiplying the level data read out from the memory means by coefficient data so as to provide a multiplied output, and adder means for adding the multiplied output and the digital video signal data to generate a gamma corrected output.

In accordance with the gamma correction circuit of the third embodiment, it is possible to allow the gamma correction characteristic to be changed by multiplying level data read out from the memory means by a suitable coefficient K.

DETAILED DESCRIPTION OF THE PREFERRED EMBODIMENTS

Preferred embodiments of a gamma correction circuit according to this invention will now be described with reference to the attached drawings in which corresponding parts are identified by the same reference numeral.

Figure 3:
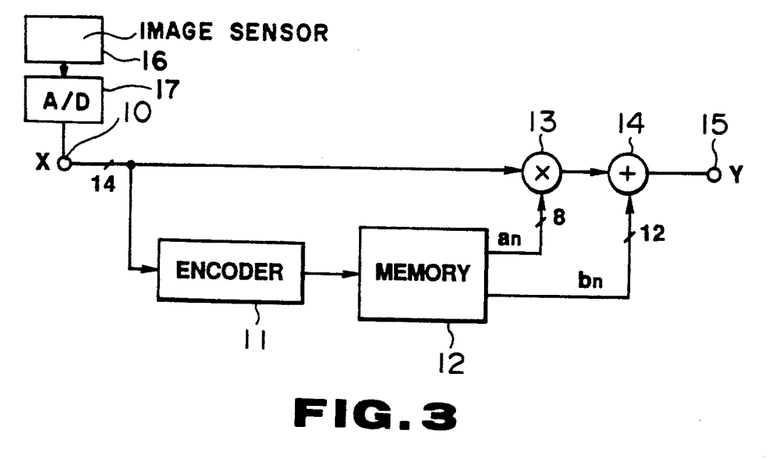
FIG. 3 is a block diagram showing the configuration of a first embodiment of a gamma correction circuit according to this invention.

Initially referring to FIG. 3, there is shown the configuration of a first embodiment of a gamma correction circuit according to the present invention. In FIG. 3, a digital video signal X provided by converting a video signal from a charge-coupled device (CCD) image sensor 16 (hereinafter referred to as a CCD) of, e.g., a video camera to digital signal data is using an analog-to-digital converter 17 delivered to an encoder 11 and a multiplier circuit 13 through an input terminal 10.

The encoder 11 converts the input digital video signal X to a readout address for a memory circuit 12.

The memory circuit 12 is comprised of, e.g., a random access memory (hereinafter referred to as a RAM). In the memory circuit 12, slopes (hereinafter referred to as slope data $a_n$) and intercepts (hereinafter referred to as intercept data $b_n$) of respective line segments forming a polygonal line approximating a gamma correction characteristic, i.e., a curve represented by $Y=X^{(1/r)}$, are stored. The slope data $a_n$ and the intercept data $b_n$ stored in the memory circuit 12 are read out on the basis of the readout address from the encoder 11. The slope data $a_n$ thus read out is delivered to the multiplier circuit 13, and the intercept data $b_n$ thus read out is delivered to an adder circuit 14.

The multiplier circuit 13 multiplies the input digital video signal X delivered through the input terminal 10 by slope data $a_n$ from the memory circuit 12 to deliver the multiplied result to the adder circuit 14.

The adder circuit 14 adds an output from the multiplier circuit 13 and intercept data $b_n$ from the memory circuit 12 to output, from an output terminal 15, the added result as a gamma corrected digital video signal Y.

Thus, in this embodiment, the memory circuit 12 is used as memory means for storing slope data and intercept data of respective line segments, the encoder 11 is used as converter means for converting a level of an input signal to a readout address for the memory circuit 12, the multiplier circuit 13 is used as multiplier means for multiplying slope data $a_n$ read out from the memory circuit 12 on the basis of an address from the encoder 11 by an input signal, and the adder circuit 14 is used as adder means for adding intercept data $b_n$ read out from the memory circuit 12 on the basis of an address from the encoder 11 and the multiplied value from the multiplier circuit 13.

The operation of the gamma correction circuit constructed as described above will now be described.

Figure 4:
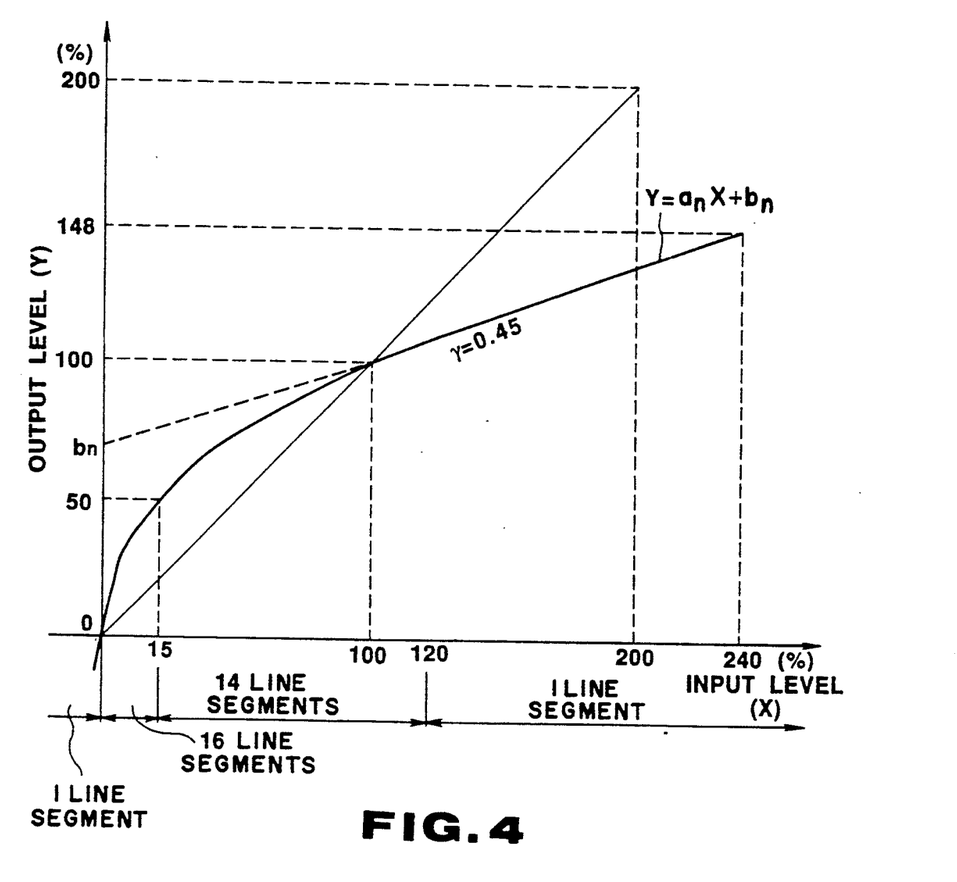
FIG. 4 is a graphical representation of a polygonal line approximation of a gamma correction characteristic composed of 32 line segments, used in the gamma correction circuit shown in FIG. 3.

In the memory circuit 12, as described above, slope data $a_n$ and intercept data $b_n$ of respective line segments of a polygonal line approximating the desired gamma correction characteristic are stored. Generally, the number of line segments representing a portion of a desired gamma correction characteristic is proportional to the degree of curvature of that portion, with highly curved portions being approximated by more segments than are used to approximate relatively straight portions. More specifically, as shown in FIG. 4, for example, when an input digital video signal X is less than 0% with respect to a reference white level, the desired gamma correction characteristic is approximated by one line segment; when the signal X is 0 to 15% with respect to the reference white level, corresponding to a black area where an output signal varies greatly, the desired gamma correction characteristic is approximated by 16 line segments; when the signal X is 15 to 120% with respect to the reference white level, the desired gamma correction characteristic is approximated by 14 line segments; and when the signal X is more than 120% with respect to the reference white level, the desired gamma correction characteristic is approximated by one line segment. Then, slope data $a_n$, assumed to be comprised of, e.g., 8 bits, and intercept data $b_n$, assumed to be comprised of, e.g., 12 bits, are stored into the memory circuit 12. Namely, in the case of a polygonal line approximation of the desired gamma correction characteristic composed of 32 line segments, the required capacity of the memory circuit 12 is equal to 640 (=(8+12)×32) bits. For example, in the case of the polygonal line approximation composed of 64 line segments, the required capacity of the memory circuit 12 is equal to 1280 (=(8+12)×64) bits.

The encoder 11 converts the input digital video signal X delivered through the input terminal 10 to a readout address for the memory circuit 12. More specifically, in the case of the above-mentioned polygonal line approximation composed of 32 segments, when the input digital video signal X is less than 0% with respect to the reference white level, the input digital video signal X of, e.g., 14 bits is converted to one address; when that signal X is 0 to 15%, the input digital video signal X is converted to one of 16 addresses; when that signal X is 15 to 120%, the input digital video signal X is converted to one of 14 addresses; and when that signal X is more than 120%, the input digital video signal X is converted to one address. Namely, the input digital video signal X of 14 bits is converted a the readout address of 5 bits in correspondence with the polygonal line approximation composed of 32 segments. Then, slope data $a_n$ and intercept data $b_n$ read out from this readout address are delivered to the multiplier circuit 13 and the adder circuit 14, respectively.

The multiplier circuit 13 multiplies the input digital video signal X by the slope data $a_n$, and the adder circuit 14 adds an output from the multiplier circuit 13 and intercept data $b_n$. Thus, a gamma corrected digital video signal Y expressed below is outputted from the output terminal 15:

$$Y = a_n \times X + b_n \quad (1)$$

As stated above, slope data $a_n$ and intercept data $b_n$ of respective line segments of a polygonal line approximating a desired gamma correction characteristic are stored in advance into the memory circuit 12. At the encoder 11, the input digital video signal X is converted to a readout address for the memory circuit 12 used to read out slope data $a_n$ and intercept data $b_n$ from the memory circuit 12 to perform the operation expressed by equation (1) at the multiplier circuit 13 and the adder circuit 14, thereby making it possible to provide a gamma corrected digital video signal. In this case, it is unnecessary to store into the memory circuit 12 data at respective points on the polygonal line. For example, in the case of the 32 segment approximation described above, since it is sufficient to store 32 sets of slope data $a_n$ and intercept data $b_n$, the capacity of the memory circuit 12 can be reduced. Further, the operation circuit can be constituted by the single multiplier circuit 13 and the single adder circuit 14. Thus, the gamma correction circuit can be realized on a circuit scale smaller than that of the prior art.

A second embodiment of a gamma correction circuit according to this invention will now be described.

Figures 5, 6:
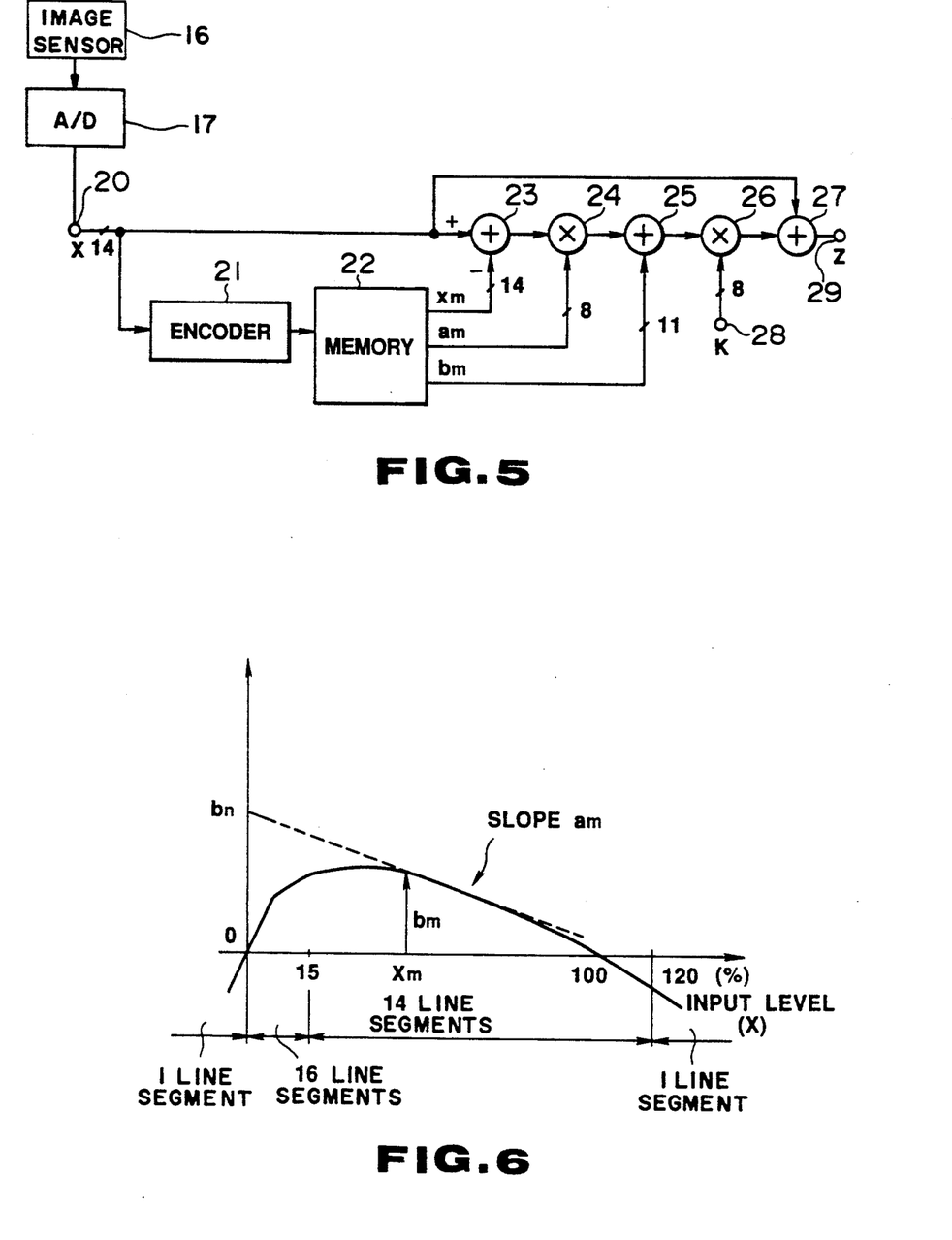
FIG. 5 is a block diagram showing the configuration of a second embodiment of a gamma correction circuit according to this invention.
FIG. 6 is a graphical representation of a polygonal line approximating a correction curve obtained by subtracting an uncorrected input signal represented as $Y=X$ from a gamma correction characteristic, composed of 32 line segments, used in the gamma correction circuit shown in FIG. 5.

In FIG. 5, an input digital video signal X, provided by converting a video signal from an image sensor 16 using an analog-to-digital converter 17, as previously described, is delivered to an encoder 21 and adder circuits 23 and 27 through an input terminal 20.

The encoder 21 converts the input digital video signal X to a readout address for a memory circuit 22 in the same manner as in the above-described embodiment.

The memory circuit may be comprised of, e.g., RAM. In the memory circuit 22, data are stored for a polygonal line approximating a correction curve obtained by subtracting an uncorrected input signal represented as Y=X from the gamma correction characteristic, i.e., the curve represented by $Y=X^{(1/r)}$. Namely, slopes of respective line segments (hereinafter referred to as slope data $a_m$) of the polygonal line approximating the correction curve, levels of the input digital video signal X at respective bend points (hereinafter referred to as bend point data $X_m$, i.e. the levels of the input digital video signal X at the intersection points for line segments of the polygonal line approximating the correction curve), and levels of the polygonal line at the bend point data $X_m$ (hereinafter referred to as intercept data $b_m$) are stored. The slope data $a_m$, the intercept data $b_m$, and the bend point data $X_m$ stored in the memory circuit 22 are read out on the basis of the readout address from the encoder 21. The bend point data $X_m$ thus read out is delivered to the subtraction terminal of the adder circuit 23, the slope data $a_m$ thus read out is delivered to the multiplier circuit 24, and the intercept data $b_m$ is delivered to the adder circuit 25.

The adder circuit 23 subtracts the bend point data $X_m$ from the input digital video signal X delivered through the input terminal 20 to deliver the subtracted result to the multiplier circuit 24.

The multiplier circuit 24 multiplies an output from the adder circuit 23 by slope data $a_m$ from the memory circuit 22 to deliver the multiplied result to the adder circuit 25.

The adder circuit 25 adds an output from the multiplier circuit 24 and intercept data $b_m$ from the memory circuit 22 to deliver the added result to a multiplier circuit 26.

The multiplier circuit 26 multiplies an output from the adder circuit 25 by a coefficient K for altering the gamma correction characteristic, delivered through a terminal 28, to deliver the multiplied result to the adder circuit 27.

The adder circuit 27 adds an output from the multiplier circuit 26 and the input digital video signal X to output, from an output terminal 29, the added result as a gamma corrected digital video signal Z.

The operation of the gamma correction circuit constructed as described above will now be described.

In the memory 22, as described above, data are stored for a polygonal line approximating a correction curve obtained by subtracting an uncorrected input signal represented as Y=X from a gamma correction characteristic. Namely, slope data $a_m$ of respective line segments of this polygonal line, bend point data $X_m$ of levels of an input digital video signal at respective bend points, and intercept data $b_m$ at bend point data $X_m$ are stored. More specifically, a correction curve obtained by drawing a line to the curve represented by Y=X from the gamma correction characteristic is approximated as shown in FIG. 6, for example. Namely, when the level of the input digital video signal X is less than 0% with respect to a reference white level, the above-mentioned correction curve is approximated by one segment of a polygonal line; when the signal X is 0 to 15%, the above-mentioned correction curve is approximated by 16 line segments; when the signal X is 15 to 120%, the above-mentioned correction curve is approximated by 14 line segments; and when the signal X is more than 120%, the correction curve is approximated by one line segment. Then, slope data $a_m$ of the 32 respective line segments of the polygonal line approximation assumed to be comprised of 8 bits, bend point data $X_m$ assumed to be comprised of 14 bits, and intercept data $b_m$ at respective levels $X_m$ assumed to be comprised of 11 bits are stored into the memory circuit 22.

The encoder 21 converts an input digital video signal X to a readout address for the memory circuit 22. More specifically, in the case of the polygonal line approximation composed of 32 line segments, an input digital video signal X of, e.g., 14 bits is converted to a readout address of 5 bits in correspondence with the 32 respective line segments of the polygonal line; approximation in the same manner as in the embodiment shown in FIG. 3. Then, bend point data $X_m$ read out by using this readout address is delivered to the adder circuit 23, the slope data $a_m$ similarly read out is delivered to the multiplier circuit 24, and the intercept data $b_m$ similarly read out is delivered to the adder circuit 25.

The adder circuit 23 subtracts the bend point data $X_m$ from the input digital video signal X, the multiplier circuit 24 multiplies an output from the adder circuit 23 by the slope data $a_m$, the adder circuit 25 adds an output from the multiplier circuit 24 and the intercept data $b_m$, the multiplier circuit 26 multiplies an output from the adder circuit 25 by the coefficient K delivered through the terminal 28, and the adder circuit 27 adds an output from the multiplier circuit 26 and the input digital video signal X. Thus, a gamma corrected digital video signal Z as described below is outputted from the output terminal 29:

$$Z = (a_m \times (X - X_m) + b_m) \times K + X \quad (2)$$

Meanwhile, at the points where the input digital video signal X is zero % and 100%, the value of the first term of the above-described equation (2) becomes equal to zero. Thus, by varying the coefficient K, it is possible to vary the curve of the gamma correction characteristic without changing the gamma correction characteristic at the points where the input digital video signal X is zero % and 100%.

As stated above, slope data $a_m$, intercept data $b_m$, and bend point data $X_m$ of respective line segments of a polygonal line approximating a correction curve obtained by subtracting an uncorrected input signal represented as Y=X from the gamma correction characteristic are stored in advance into the memory circuit 22. At the encoder 21, the input digital video signal X is converted to a readout address for the memory circuit 22 to read out, from the memory circuit 22, the slope data $a_m$, the intercept data $b_m$, and the bend point data $X_m$ on the basis of this readout address to perform the operation shown in the equation (2) at the adder circuits 23 to 27, thereby making it possible to provide a gamma corrected digital video signal Z. In this case, it is unnecessary to store data at respective points of the polygonal line into the memory circuit 22. For example, in the case of the polygonal line approximation composed of 32 line segment as described above, since it is sufficient to store 32 sets of slope data $a_m$, intercept data $b_m$, and bend point data $X_m$, the capacity of the memory circuit 22 can be reduced. Further, the operation circuit can be constituted with two multiplier circuits 24 and 26, and three adder circuits 23, 25 and 27. Thus, the gamma correction circuit can be constituted on a circuit scale smaller than that of the prior art. In addition, the gamma correction characteristic can be altered by using the coefficient K delivered through the terminal 28.

Further, by subtracting bend point data $X_m$ from the input digital video signal X at the adder circuit 23, the number of bits multiplied at the multiplier circuit 24 can be reduced relative to the embodiment shown in FIG. 3. In addition, since the maximum value of the intercept data $b_m$ of this embodiment is smaller than the maximum value of the intercept data $b_n$ of the embodiment shown in FIG. 3, the number of bits required for storage can be reduced relative to the embodiment shown in FIG. 3.

As stated above, in the gamma correction circuit according to this embodiment, there is employed an approach to store in advance slope data, intercept data and bend point data defining successive segments of a polygonal line approximating a correction curve obtained by subtracting an uncorrected input signal from a desired gamma correction characteristic into the memory means, to convert digital video signal data to a readout address for the memory means at the address conversion means, to read out the slope data, intercept data and bend point data from the memory means on the basis of this readout address, to perform processing at the multiplier means and the adder means, thus generating gamma corrected digital video signal. It is unnecessary to store data for respective points on the polygonal line into the memory means, thus making it possible to reduce the capacity of the memory means. Further, the circuit for the above-mentioned operation can be simply constituted. Thus, the gamma correction circuit can be realized on a circuit scale smaller than that of the prior art. In other words, it becomes easy to construct the gamma correction circuit as an integrated circuit, and its power consumption can be smaller than that of the prior art. As a result, the number of line segments forming a polygonal line can be larger than that of the prior art, so precision of approximation can be higher. In addition, by changing the values of the slope data and the intercept data stored in the memory means, it is possible to readily provide correspondence with different gamma correction characteristics, e.g., at different broadcasting stations.

A third embodiment of a gamma correction circuit according to this invention will now be described.

Figure 7:
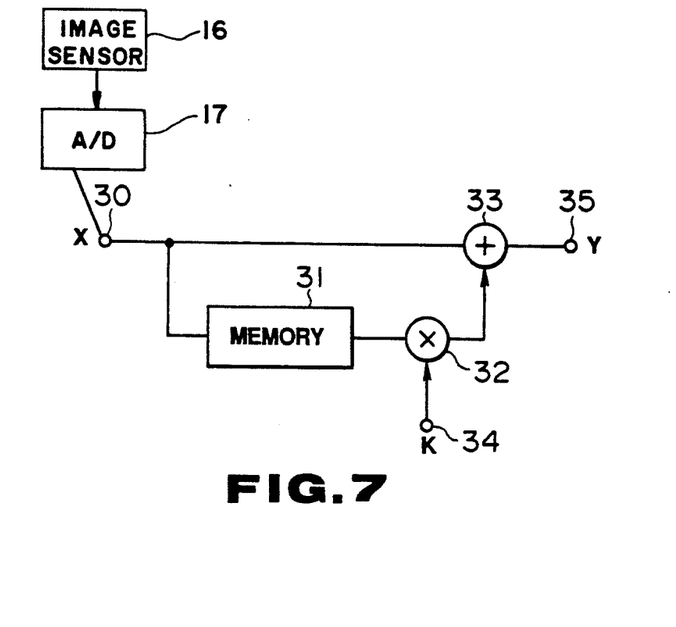
FIG. 7 is a block diagram showing the configuration of a third embodiment of a gamma correction circuit according to this invention.

In FIG. 7, a digital video signal X provided by converting a video signal, e.g., from a CCD image sensor 16 (CCD) of a video camera to digital signal data using an analog-to-digital converter 17 is delivered to a memory circuit 31 and an adder circuit 33 through an input terminal 30.

Figure 8:
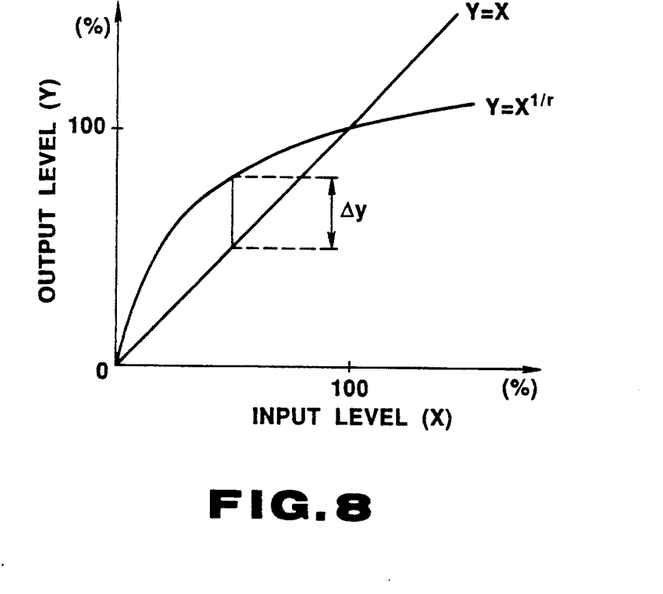
FIG. 8 is a graphical representation of a gamma correction characteristic for explaining the principle of gamma correction performed by the gamma correction circuit shown in FIG. 7.
Figure 9:
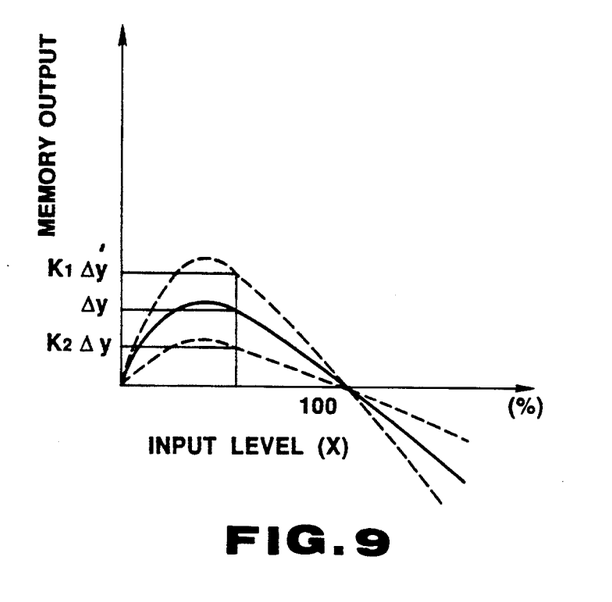
FIG. 9 is a graphical representation of curves obtained by subtracting a line $Y=X$ from the gamma correction characteristic shown in FIG. 8.

The memory circuit 31 is comprised of, e.g., a random access memory (RAM) or a read only memory (hereinafter referred to as a ROM). In the memory circuit 31, as shown in FIG. 8, values (hereinafter referred to as correction level data or reference data $\Delta y$) on a curve obtained by subtracting an uncorrected input signal represented as Y=X from a gamma correction characteristic, i.e., a curve represented by $Y = X^{(1/r)}$, are stored and subsequently read out by using the input digital video signal X as a readout address, as in the curve indicated by the solid line of FIG. 9. The reference data Δy thus read out is supplied to a multiplier circuit 32.

The multiplier circuit 32 multiplies the reference data by a coefficient K used for altering a gamma correction characteristic and supplied through a terminal 34, and supplies the multiplied result to the adder circuit 33.

The adder circuit 33 adds an output from the multiplier circuit 32 and the input digital video signal X to output, from an output terminal 35, the added result as a gamma corrected digital video signal Y.

Thus, in this embodiment, the memory circuit 31 is used as memory means for storing each level of the curve obtained by subtracting the line Y=X from the gamma correction characteristic at respective addresses corresponding to the values of said digital video signal data, the multiplier circuit 32 is used as multiplier means for multiplying the level data read out from the memory 31 by the coefficient K, and the adder circuit 33 is used as adder means for adding an output from the multiplier circuit 32 and the input signal.

The operation of the gamma correction circuit constructed as described above will now be described.

Figure 10:
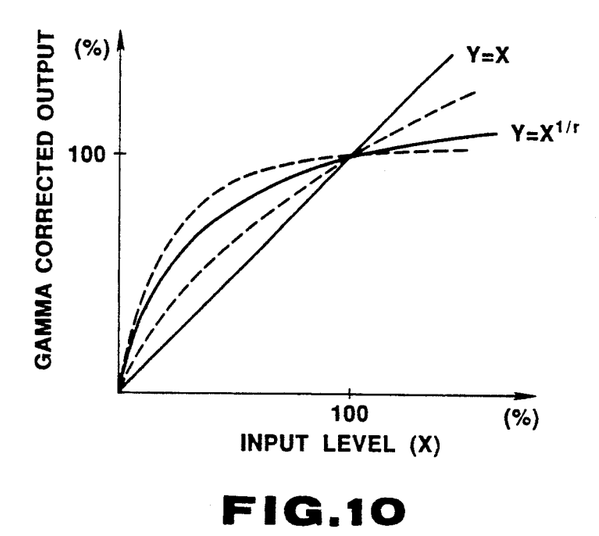
FIG. 10 is a graphical representation of family of gamma correction characteristics generated when the coefficient K is changed in the gamma correction circuit shown in FIG. 7.

Reference data Δy stored in the memory circuit 31 is zero at the points where the input digital video signal X is zero % and 100% of a reference white level. Thus, changing the coefficient K delivered through the terminal 34, does not change an output from the multiplier circuit 32 at the points where the input digital video signal X is zero % and 100%, and changes the output from the multiplier circuit 32 to a value K times the reference data Δy at points other than the above, as shown in the curves indicated by broken lines in FIG. 9. Accordingly, the gamma correction circuit of this embodiment can vary the curve of the gamma correction characteristic without changing the gamma correction characteristic at the points where the input digital video signal X is zero % and 100% as shown in FIG. 10.

As described above, the gamma correction circuit of this embodiment employs an approach to store into the memory circuit 31 level data obtained by subtracting a curve representing uncorrected input data, i.e., the line Y=X, from the desired gamma correction characteristic, to multiply level data (reference data Δy) read out from the memory circuit 31 on the basis of the value of the input digital video signal X by the coefficient K at the multiplier circuit 32, to add an output from the multiplier circuit 32 and the input digital video signal X at the adder circuit 33, thereby permitting the gamma correction characteristic to be changeable. In addition, since the operation circuit can be constituted with the single multiplier circuit 32 and the single adder circuit 33, a gamma correction circuit with a gamma correction characteristic that can be readily changed can be constructed on a circuit scale smaller than that of the prior art.

As stated above, the gamma correction circuit according to this embodiment employs an approach to store, into the memory means, level data obtained by subtracting the line Y=X from the gamma correction characteristic, to read out level data using the value of an input signal as an address, to multiply the level data read out by the coefficient K at the multiplier means, to add an output from the multiplier means and the input signal, thereby permitting the gamma correction characteristic to be changeable. Moreover, it is sufficient to store only one gamma correction characteristic serving as reference into the memory means. As a result, the capacity of the memory means can be reduced, and the circuit for the above-mentioned operation can be simply constituted. Thus, a gamma correction circuit capable of varying the gamma correction characteristic can be realized on a circuit scale smaller than that of the prior art. In other words, the gamma correction circuit can be easily implemented as integrated circuit, and its power consumption can be smaller than that of the prior art. Further, by changing the coefficient K, it is possible to readily provide correspondence with different gamma correction characteristics, e.g., at different broadcasting stations.

Although illustrative embodiments of the present invention, and various modifications thereof, have been described in detail herein with reference to the accompanying drawings, it is to be understood that the invention is not limited to those precise embodiments and the described modifications, and that various changes and further modifications may be effected therein by one skilled in the art without departing from the scope or spirit of the invention as defined in the appended claims.

What is claimed is:

1. A gamma correction circuit for use with a video camera having image pick-up means for generating a video signal corresponding to an object image and analog-to-digital (A/D) converter means for converting said video signal to corresponding digital video signal data, said gamma correction circuit comprising:

memory means for storing slope data and intercept data defining successive segments of a polygonal line approximating a desired gamma correction characteristic and which are stored at respective addresses of said memory means, said polygonal line being composed of 32 of said segments, the desired gamma correction characteristic for digital video signal data less than 0% with respect to a reference white level being approximated by one of said segments, the desired gamma correction characteristic for digital video signal data of 0 to 15% with respect to said reference white level being approximated by 16 of said segments, the desired gamma correction characteristic for digital video signal data of 15 to 120% with respect to said reference white level being approximated by 14 of said segments, and the desired gamma correction characteristic for digital video signal data more than 120% with respect to said reference white level being approximated by one of said segments, converter means for converting said digital video signal data to readout address data applied to said memory means for reading out the slope data and intercept data stored at respective addresses thereof, multiplier means for multiplying slope data read out from said memory means by said digital video signal data so as to provide a multiplied output, and adder means for adding intercept data read out from said memory means and said multiplied output so as to generate a gamma corrected output.

2. A gamma correction circuit for use with a video camera having image pick-up means for generating a video signal corresponding to an object image and analog-to-digital (A/D) converter means for converting said video signal to corresponding digital video signal data, said gamma correction circuit comprising:

memory means for storing at respective addresses of said memory means slope data, intercept data and bend point data defining successive segments of a polygonal line approximating a correction curve obtained by subtracting uncorrected digital video signal data from a desired gamma correction characteristic, converter means for converting said digital video signal data to readout address data applied to said memory means for reading out the slope data, intercept data and bend point data stored at respective addresses thereof, subtractor means for subtracting, from said digital video signal data, bend point data read out from said memory means so as to provide a subtracted output, multiplier means for multiplying slope data read out from said memory means by said subtracted output so as to provide a multiplied output, adder means for adding intercept data read out from said memory means and said multiplied output so as to generate a gamma corrected output, and second adder means for adding a first added output from said adder means and said digital video signal data to generate a gamma corrected digital video signal.

3. A gamma correction circuit as claim 2, further comprising:

second multiplier means for multiplying said first added output by a coefficient so as to provide a second multiplied output to said second adder means in lieu of said first added output.

4. A gamma correction circuit as in claim 2, wherein said polygonal line approximating said correction curve is composed of 32 of said segments, the correction curve for digital video signal data less than 0% with respect to a reference white level is approximated by one of said segments, the correction curve for digital video signal data of 0 to 15% with respect to said reference white level is approximated by 16 of said segments, the correction curve for digital video signal data of 15 to 120% with respect to said reference white level is approximated by 14 of said segments, and the correction curve for digital video signal data more than 120% with respect to said reference white level is approximated by one of said segments.

5. A gamma correction circuit for use with a video camera having image pick-up means for generating a video signal corresponding to an object image, and analog-to-digital (A/D) converter means for converting said video signal to corresponding digital video signal data, said gamma correction circuit comprising:

memory means for storing level data at, and reading level data from respective addresses corresponding to the values of said digital video signal data, said level data representing differences between uncorrected digital video signal data and respective desired gamma correction characteristic data, multiplier means for multiplying the level data read from said memory means by coefficient data so as to provide a multiplied output, and adder means for adding said multiplied output and said digital video signal data to generate a gamma corrected output.

* * * * *